United States Patent [19]

Carte

[11] 4,221,395
[45] Sep. 9, 1980

[54] HURDLE HAULER

[76] Inventor: James Carte, 3901 Grandview Ave., Shadyside, Ohio 43947

[21] Appl. No.: 963,351

[22] Filed: Nov. 24, 1978

[51] Int. Cl.² .............................................. B60P 3/00
[52] U.S. Cl. ................................... 280/79.3; 211/13; 211/59.1; 211/182; 280/786; 280/789
[58] Field of Search ..................... 280/79.1 A, 79.1 R, 280/79.3, 179 R, 786, 787, 789, 29; 211/13, 59.1, 1, 182, 27

[56] References Cited

U.S. PATENT DOCUMENTS

| | | | |
|---|---|---|---|
| Re. 29,455 | 10/1977 | Slayton | 280/786 |
| 525,162 | 8/1894 | Schwartz, Jr. | 211/27 X |
| 2,245,789 | 6/1941 | Klavik | 280/786 |
| 2,626,711 | 1/1953 | Saul, Jr. et al. | 280/79.3 X |
| 2,682,956 | 7/1954 | Pike | 211/59.1 X |
| 2,760,647 | 8/1956 | Saul, Jr. | 280/79.3 X |
| 2,894,638 | 7/1959 | Northover | 211/13 |
| 2,904,383 | 9/1959 | Potts | 211/1 X |
| 3,409,141 | 11/1968 | Cunningham, Jr. et al. | 211/13 |
| 3,488,063 | 1/1970 | Risser | 280/79.3 |

*Primary Examiner*—John J. Love
*Assistant Examiner*—Milton L. Smith
*Attorney, Agent, or Firm*—O'Brien & Marks

[57] ABSTRACT

A hurdle hauler for hauling hurdles of the type used in track meets includes an elongated beam supported by wheels with pairs of vertically extending stanchions affixed to the beam. Each pair of stanchions includes supports to support a hurdle and the distances between the stanchions of each pair is greater than the distance between the adjacent stanchions of adjacent pairs of stanchions. The supports on the stanchions to support a hurdle include upwardly extending arms on opposite sides of each stanchion.

11 Claims, 3 Drawing Figures

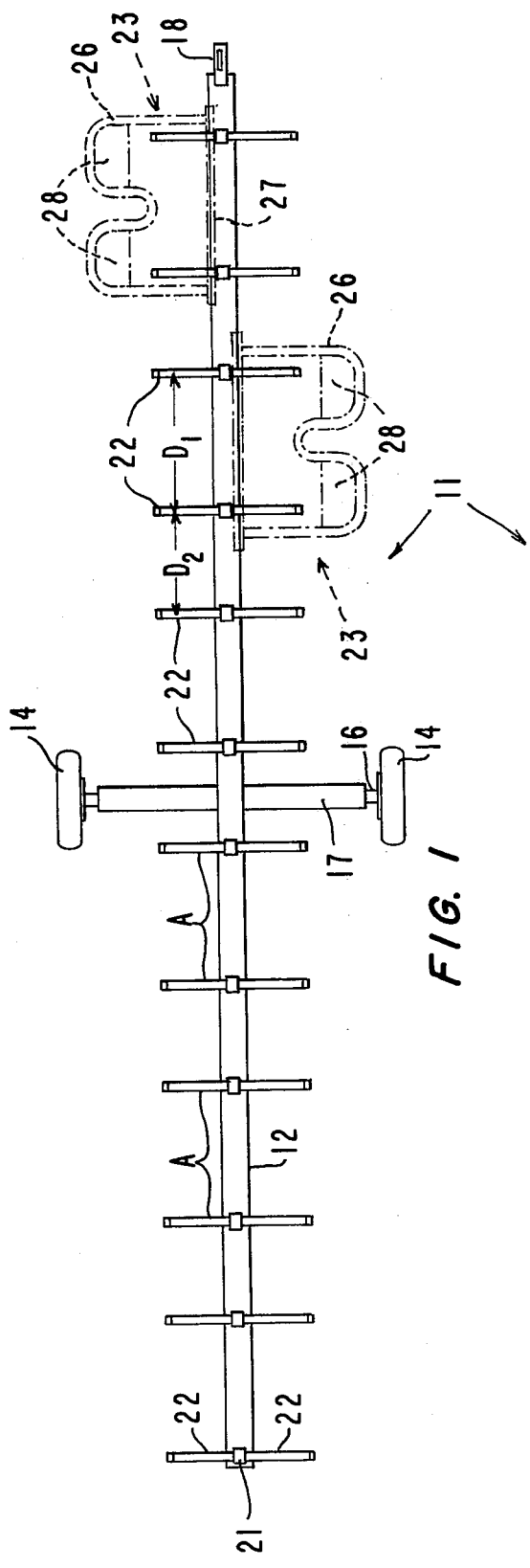
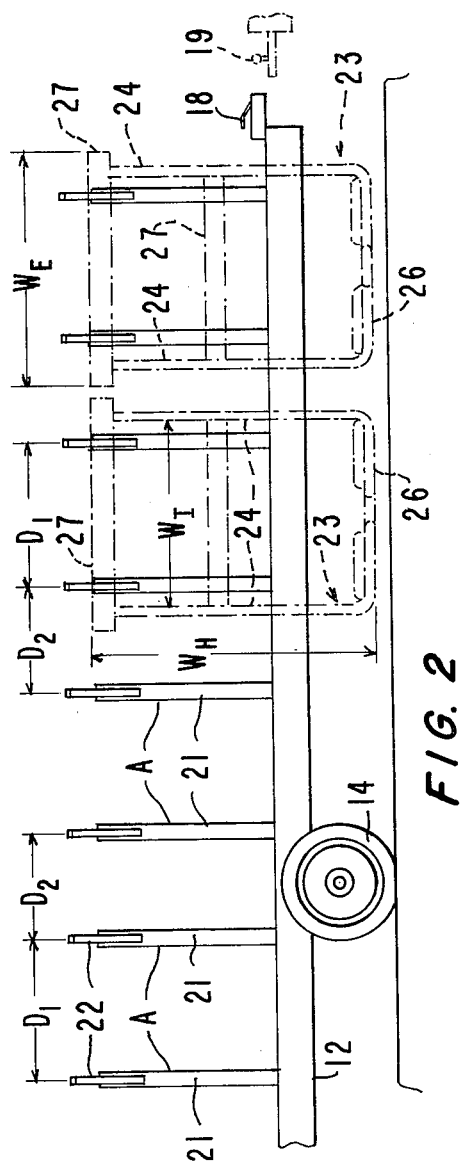
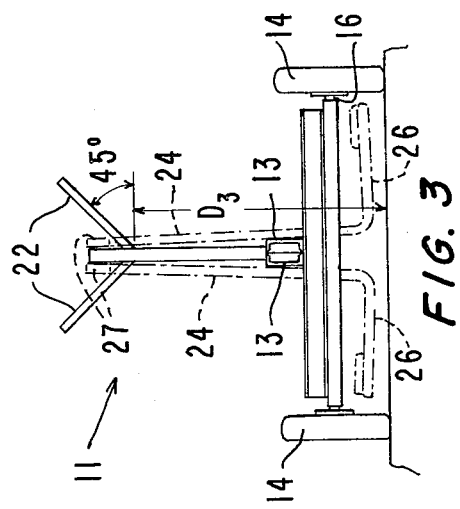

HURDLE HAULER

BACKGROUND OF THE INVENTION

1. Field of the Invention

Track meets normally include hurdle events that involve using a portion of the track over which sprints and other runs are timed. As hurdles, high or low (some are convertible) are heavy, and require considerable time to move and set up for different hurdle races, the customary practice of manually transporting and positioning hurdles from where stored or left after the preceeding meet or practice session is time consuming, inefficient and the resulting delay aggravating to other athletes waiting to compete.

2. Description of the Prior Art

While wheeled carriages for transporting lighting fixtures (United States Patent No. 2,894,638) and mobile pegracks for supporting various articles used in industrial operations (U.S. Pat. No. 2,626,711 and No. 2,760,647) are known, to the applicants knowledge the use of a wheeled hauler for track hurdles has heretofore been unknown.

SUMMARY OF THE INVENTION

The invention is a wheeled hauler for transporting and or storing hurdles used in track events. Vertical stanchions with support arms attached are affixed to an elongated beam in a manner permitting relatively easy on and off loading of hurdles with as little lifting as possible, a desired requisite. The wheels are positioned so as to permit ready attachment to a towing vehicle.

BRIEF DESCRIPTION OF THE DRAWINGS

Numerous objects and advantages of the invention will become apparent from a reading of the following description in light of the appended drawing wherein:

FIG. 1 is a plan view of a preferred embodiment of a hurdle hauler in accordance with the principles of this invention.

FIG. 2 is a partial side elevational view of the invention shown in FIG. 1 further illustrating the unique manner in which a hurdle is supported thereon; and FIG. 3 is an end view of the preferred embodiment shown in FIG. 1.

DESCRIPTION OF THE PREFERRED EMBODIMENT

The drawing illustrates a preferred embodiment of the invention arranged as a hurdle hauler generally designated by the reference numeral 11. The hauler 11 includes an elongated beam 12 formed of channel irons 13 secured together flange to flange, top and bottom as by welding as shown in FIG. 3. Beam 12 of course may be formed of wood and needn't be hollow.

Wheels 14 bearing mounted on axle 16 affixed to a cross I-Beam 17 support the beam 12 at its approximate midpoint to facilitate lifting the front end of the beam and affixing a socket type hitch 18 to a suitable ball 19 on a towing vehicle not shown.

A plurality of vertical stanchions 21, each having oppositely disposed, upwardly extending arms 22 affixed thereto are spaced along the length of beam 12. The arms 22 extend transversely of beam 12 preferably an an angle of 45° from the horizontal. The stanchions and arms may be formed of metal and welded together to the beam. These same members may also be made of non-metal such as wood.

Stanchions 21 are arranged in separate pairs $A_1$, the stanchions in each pair being spaced a distance $D_1$. Adjacent stanchions 21 in the respective pair of stanchions A are equally spaced a distance $D_2$ which is less than $D_1$.

The invention as shown in the drawing is dimensioned to haul commerically available track hurdles 23 such as those manufactured by the Harry Gill Company of Urbana, Ill., for instance. Generally such hurdles 23 may be formed of tubular metal uprights 24 and base 26 with one or more cross bars 27 affixed to the uprights. Typically the top cross bar can be adjustably positioned vertically up to 39" for the high hurdle event. The base 26 may include weights 28 so that the hurdle 23 if tipped is counter balanced to return to the vertical.

Typically high track hurdles 23 are thus 39" high (WH), have an external cross bar width of $W_E$, and an internal width between uprights 24 of $W_I$.

As shown in FIGS. 1 and 2, the dimension $D_1$ is made less than $W_1$ though it may be greater than $W_1$. In either case the top cross bar 27 of each hurdle can be supported near its opposite ends by the hangers or support arms 22 on the stanchions forming each pair of stanchions A. With $D_1$ greater than $W_1$ the hurdle uprights 24 are supported between the stanchions 21 of each pair. To prevent overlap of opposing ends of cross bars 27, when the hurdles 23 are supported on the hauler 11, the combined dimensions $D_1$, $D_2$ are made greater than $W_E$.

As shown in FIG. 3, the support arms 22 are attached to the stanchions 21 at a distance $D_3$ above ground level that must be greater than $W_H$ less the width of cross bar 27 to avoid dragging of and damage to the hurdles 23.

As can be seen, the hauler 11 when fully loaded with one or more hurdles 23 on both sides of each pair of stanchions A will be quite heavy. However, and regardless of the load, with the wheels 14 at the midpoint of the beam 12, the hauler can still be tipped and easily hitched to a towing vehicle. And by keeping $D_3$ and the ends of arms 22 as close to the ground as possible, lifting of the hurdles 23 during on and off loading can be minimized.

While a preferred embodiment of the invention has been described in detail numerous changes and modifications can be made within the principles thereof which is to be limited only by the scope of the appended claims.

What is claimed is:

1. In a wheeled hauler arranged for the transport of track hurdles formed of vertical uprights spaced an internal width $W_I$ and a cross bar affixed thereto having an external width $W_E$, a single, elongated beam;

at least one set of wheel means affixed to and supporting said elongated beam;

a plurality of spaced vertical, stanchions affixed to said beam, adjacent, separate pairs of said vertical stanchions being equally spaced a first distance $D_1$, adjacent stanchions of said separate pairs of stanchions being equally spaced a second distance $D_2$ less than said first distance, said first distance differing from said internal width $W_I$ of the uprights of said hurdle and less than the external width $W_E$ of the cross bar of said hurdles to be transported;

oppositely disposed, angularly and upwardly extending arms affixed to each of said vertical stanchions, said arms extending transversely of said elongated beam, said arms on said adjacent, separate pairs of vertical stanchions being arranged to support said cross bar of said hurdle at two points, one or more of said hurdles being supported on opposite sides of a pair of said vertical stanchions.

2. The invention as defined in claim 1 wherein said wheel means are affixed to said elongated beam at approximately the mid-point thereof.

3. The invention as defined in claim 1 including means for hitching said elongated beam to a towing vehicle.

4. The invention as defined in claim 1 wherein said arms affixed to said vertical supports extend upwardly at an angle of up to 45° from the horizontal.

5. The invention as defined in claim 1 wherein said elongated beam is formed of a pair of channel irons welded together flange to flange, at one or more points along the length thereof to secure the same together.

6. The invention defined in claim 1 wherein all members are formed of metal.

7. The invention as defined in claim 1 wherein at least one of the members is formed of non-metallic material.

8. The invention as defined in claim 1 wherein the combined first and second distances is greater than the external width of the hurdle to be supported.

9. The invention as defined in claim 1 wherein the dimension $D_1$ is less than the dimension WI.

10. The invention as defined in claim 1 wherein the dimension $D_1$ is greater than WI.

11. The invention as defined in claim 1, wherein said arms are affixed to said stanchions a third distance above the horizontal when said elongated beam is in the same position, said third distance being sufficient to support said hurdles above the surface over which to be transported.

* * * * *